United States Patent [19]
Royneberg

[11] Patent Number: 5,083,978
[45] Date of Patent: Jan. 28, 1992

[54] POTATO HARVESTER AND METHOD

[75] Inventor: Erling Royneberg, Naerbo, Norway

[73] Assignee: Kverneland Underhaug AS, Naerbo, Norway

[21] Appl. No.: 577,929

[22] Filed: Sep. 5, 1990

[30] Foreign Application Priority Data

Sep. 12, 1989 [GB] United Kingdom ............... 8920576

[51] Int. Cl.$^5$ ............................................. A01D 17/00
[52] U.S. Cl. ................................... 460/149; 460/904; 56/327.1; 414/345; 414/523
[58] Field of Search ............... 460/904, 114, 123, 149; 56/14.6, 327.1, 328.1; 172/33; 171/138, 16, 110, 10, 23, 144; 414/345, 334, 389, 398, 523, 528

[56] References Cited

U.S. PATENT DOCUMENTS

| | | | |
|---|---|---|---|
| 2,621,456 | 12/1952 | Peterson. | |
| 3,750,858 | 8/1973 | White | 198/115 |
| 4,262,477 | 4/1981 | Turold et al. | 56/327.1 |
| 4,842,076 | 6/1989 | Welp | 460/123 |

FOREIGN PATENT DOCUMENTS

| | | |
|---|---|---|
| 45501 | 7/1988 | Fed. Rep. of Germany. |
| 118357 | 7/1988 | Fed. Rep. of Germany. |
| 3700095 | 7/1988 | Fed. Rep. of Germany. |

OTHER PUBLICATIONS

Abstract of Soviet Union 1087-104-A, Entitled Root Harvester Unloading Elevator, Printed in Soviet Inventions Illustrated, P, Q Section, Week 8535, Oct. 9, 1985.

Primary Examiner—Terry L. Melius
Attorney, Agent, or Firm—Merchant & Gould, Smith, Edell, Welter & Schmidt

[57] ABSTRACT

There is disclosed a root crop harvesting machine, especially a potato harvesting machine which can dig-up two rows of crop and then discharging the crop laterally of the machine to any required extent via an elevator which is adjusted to a lateral discharge mode, as shown in FIG. 1, to permit the dug-up crop to be deposited in rows for drying purposes. Once drying has been completed, the same machine can then be used to pick-up the dried crop and then, following adjustment of the elevator to an elevational position as shown in FIG. 2, the dried crop can be discharged into a collecting vehicle. The harvesting machine of the invention therefore has two discharge functions, and can replace two existing pieces of equipment. The invention also enables novel methods of crop harvesting to be carried out.

6 Claims, 6 Drawing Sheets

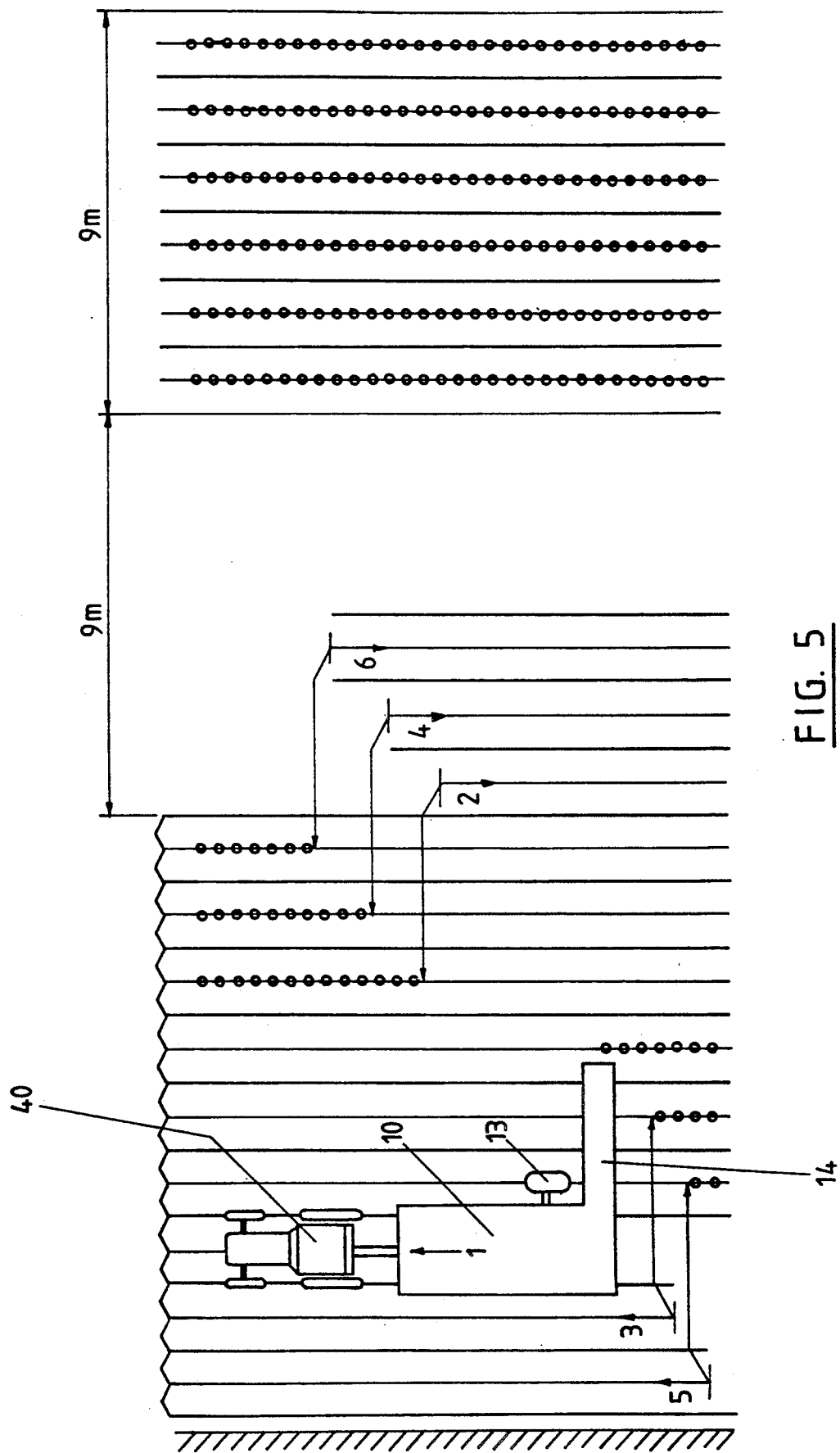

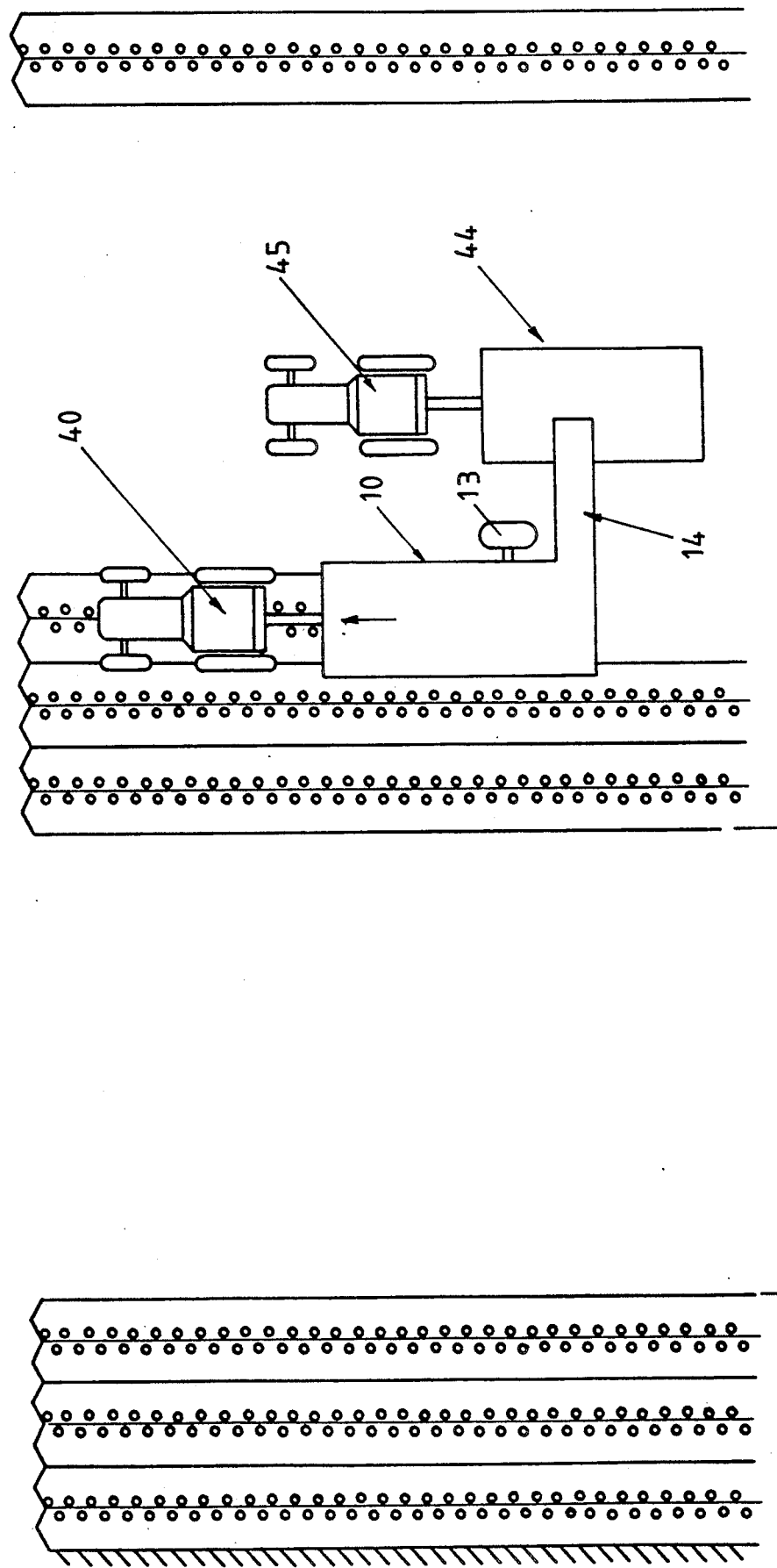

POTATO HARVESTER AND METHOD

FIELD OF THE INVENTION

This invention relates to an agricultural harvesting machine for root crops, such as potatoes.

As is well known, potatoes are grown in the field in earthed-up rows, with furrows being left along each side of the rows, and once the potatoes are ready for harvesting, a potato harvester is drawn behind a tractor and usually is able to dig under and lift-up the potatoes and any attached soil of two rows at one time during each pass down the field. During each pass, the wheels of the tractor and of the trailed harvester run in the furrows between adjacent rows of potatoes.

Most existing harvesters either have a temporary box store which is filled progressively with potatoes and then emptied at required intervals, or else discharges the potatoes as they are harvested to a separate collector vehicle which moves with and alongside the harvester.

This type of operation is satisfactory for the harvesting of potatoes which are intended for consumption, but there is a growing demand by some farmers and especially those who grow potatoes to the higher standard required for seed potatoes, to enable potatoes which have just been lifted from the ground to be deposited onto the field so as to be thoroughly dried (usually for a few hours) before being picked-up again. This is somewhat similar to the partial drying of newly cut grass to form hay.

With a view to meeting this need, a digger windrower has been developed in the United States by Lockwood Corporation, and which has the function of lifting-up two rows of potatoes in the ground, in the manner of a conventional potato digger or harvester, and then after separation of soil and stones also lifted-up with the potatoes during rearward passage through the machine, the potatoes are discharged to one side of the machine to form a single deposited row. Therefore, during each pass along the field, two rows of potatoes can be dug up, and then discharged laterally to form a single row which can be allowed to dry for a required length of time.

A conventional potato harvester can then be used after the required drying has been completed, in order to pick-up the potatoes in the drying rows.

This known digger windrower is therefore able to meet the requirements of some farmers who wish to return harvested potatoes onto the ground for drying purposes prior to further collection of the dried potatoes. However, this involves the use of a separate harvester to pick-up the rows of deposited and dried potatoes, and therefore two separate pieces of capital equipment are required to complete the overall potato harvesting operation, which of course is an additional cost as compared with normal potato harvesting (without drying in rows in the field) when only a single harvester is required.

There is therefore a need to provide a single piece of agricultural equipment which is able to dig-up root crops in the ground, such as potatoes, or to pick-up rows of dug-crop previously desposited for drying purposes, but which has a dual discharge function of being able in one mode of operation to discharge the dug-crop laterally of the equipment to form a row of crop lying on the ground for any required air drying, and in a further mode of operation to discharge the crop to a collecting vehicle.

SUMMARY OF THE INVENTION

According to one aspect of the invention there is provided a harvesting machine for root crops growing in substantially parallel rows in the ground and which comprises:

a wheel supported frame which is movable over the ground in a direction parallel to said rows with the wheels running along the ground in the spaces defined between the rows:

a digging mechanism at the forward end of the machine and extending laterally by a sufficient extent to enable two adjacent rows of growing crop to be dug up at the same time:

means provided on the machine for separating the crop from any soil and small stones dug-up at the same time as the crop:

means for directing the separated crop to a discharge station: and a discharge elevator mounted on one side of the machine adjacent to the discharge station:

characterised in that the discharge elevator comprises a main portion which is pivotally mounted at one end to the frame of the machine and a tail portion which is pivotally connected to the main portion;

and in that the main portion and the tail portion of the elevator are pivotally adjustable between a first mode of operation in which the crop can be discharged laterally of the machine to be deposited in a parallel row alongside the path of travel of the machine, and a second mode of operation in which the crop can be elevated so as to be able to fall under gravity into a collecting vehicle located alongside the machine.

Thus, the invention provides a single piece of agricultural equipment which can be operated in the manner of a conventional harvester in order to dig-up crop growing in rows in the ground (especially potatoes), or to raise crop previously dug-up and then deposited in rows on the ground, and in which the harvester machine can be readily adjusted to operate in either one of two required discharge modes, namely the lateral deposition mode when air drying of the crop in rows on the ground is required, and the lateral elevation mode when the crop is required to be collected in an adjacent collecting vehicle.

In the first mode of operation, the main portion of the elevator may be adjusted so as to extend substantially horizontal, or at a small upward inclination to the horizontal, and the tail portion is adjusted to extend downwardly of the end of the main portion so that its lower end can be located close to the ground surface and thereby reduce the distance through which the crop must fall onto the ground and minimise the risk of damage to the crop.

The adjustment of the main and tail portions of the elevator conveniently also will be such that the crop can be deposited in one of the existing furrows located adjacent to the machine. The deposited crop is therefore held in the furrows while it undergoes any required air drying, prior to a further passage of the machine along the furrows in order to pick-up the dried crop.

It will be appreciated that the machine can pick-up two rows of a growing crop, but will deposit these two rows into a single drying row. However, in one preferred mode of operation of the machine, the machine can be caused to follow a predetermined pattern of movement backwards and forwards over the rows of growing crop, such that during one forward passage two rows of a growing crop can be deposited into a single drying row, and during one reverse passage two further growing rows of crops can be deposited into the same drying row.

The subsequent harvesting of the dried rows of crop will then involve only one quarter of the number of paths of travel required, as compared with that required for the initial digging-up of the growing crop.

To permit further variation in the pattern of operation of the machine, the tail portion may be adjustable to occupy more than one position relative to the main portion, when in its first mode of operation, so as to permit variation in the extent of lateral discharge of the crop from the machine. Thus, if deposit of the crop is required into furrows located nearer to the machine, the tail portion may be inwardly pivoted relative to the main portion so as to direct the crop to be deposited in any particular furrow.

The use of a harvesting machine according to the invention therefore provides a capital cost saving by being able to perform the functions of two separate pieces of equipment, namely a digger windrower and a separate harvester. In addition, this can give economies in use of manpower, and also reduces the extent of soil compaction necessarily involved in moving pieces of agricultural equipment over the ground.

Also, by careful control over the harvesting operation, it is possible to ensure that the headlands can be cleared of growing crop, and also the ground to one side of the machine at which a collecting vehicle will be positioned.

According to a further aspect of the invention there is provided a method of harvesting root crops growing in substantially parallel rows in the ground, with longitudinal spaces defined between adjacent rows over which can travel the wheels of a propelling vehicle and a trailed havesting machine coupled therewith, said machine having an elevator mounted thereon for discharging the harvested crop, and said method comprising:

digging-up two adjacent rows of crops at a time with the harvesting machine during each passage of the machine;

separating-out the crop in the machine from any soil and stones dug-up with the crop, and directing the crop to a discharge station:

laterally discharging the crop from the machine via the elevator, when the latter is adjusted to a lateral deposition mode, to deposit the crop in a row extending substantially parallel to the dug-up rows, and while the machine is digging-up the crop in said rows during each passage of the machine:

allowing the crop deposited in said rows to dry to any required extent;

picking-up the deposited crop in the drying rows after required drying and using the same harvesting machine; and, elevating the crop via the elevator, when the latter is adjusted to an elevation mode, so that the crop can fall under gravity into a collecting vehicle located alongside the harvesting machine.

BRIEF DESCRIPTION OF THE DRAWINGS

FIG. 5 is a schematic view, similar to FIG. 4, showing a further method in accordance with the invention; and;

FIG. 6 is a schematic view showing the manner by which dug-up crop which has been deposited in rows in the field in the manner shown in FIG. 1 can be picked-up and then elevated to be collected in a collecting vehicle alongside the harvesting machine.

DESCRIPTION OF PREFERRED EMBODIMENT

Figure 1:
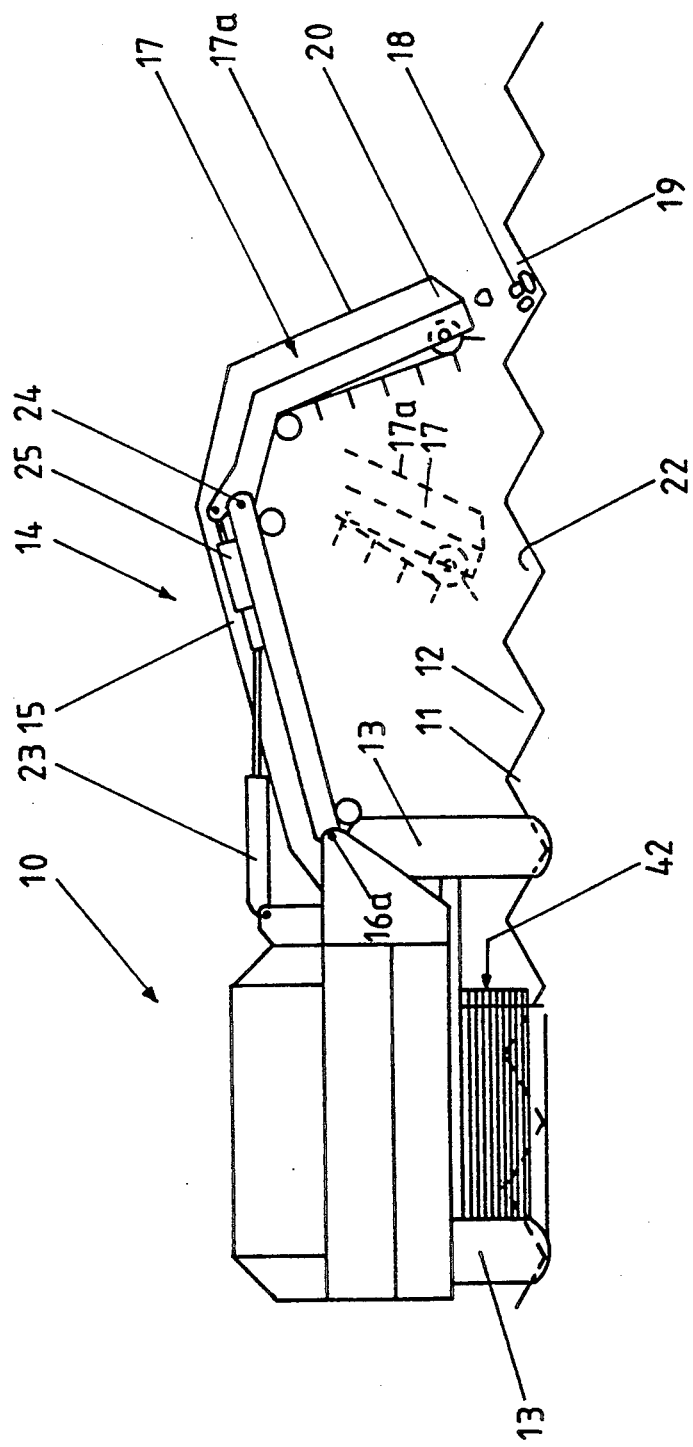
FIG. 1 is a rear view of an agricultural harvesting machine according to the invention for root crops, and illustrating the machine discharging the harvested crop via a lateral discharge elevator when adjusted to one mode of discharge operation.
Figure 2:
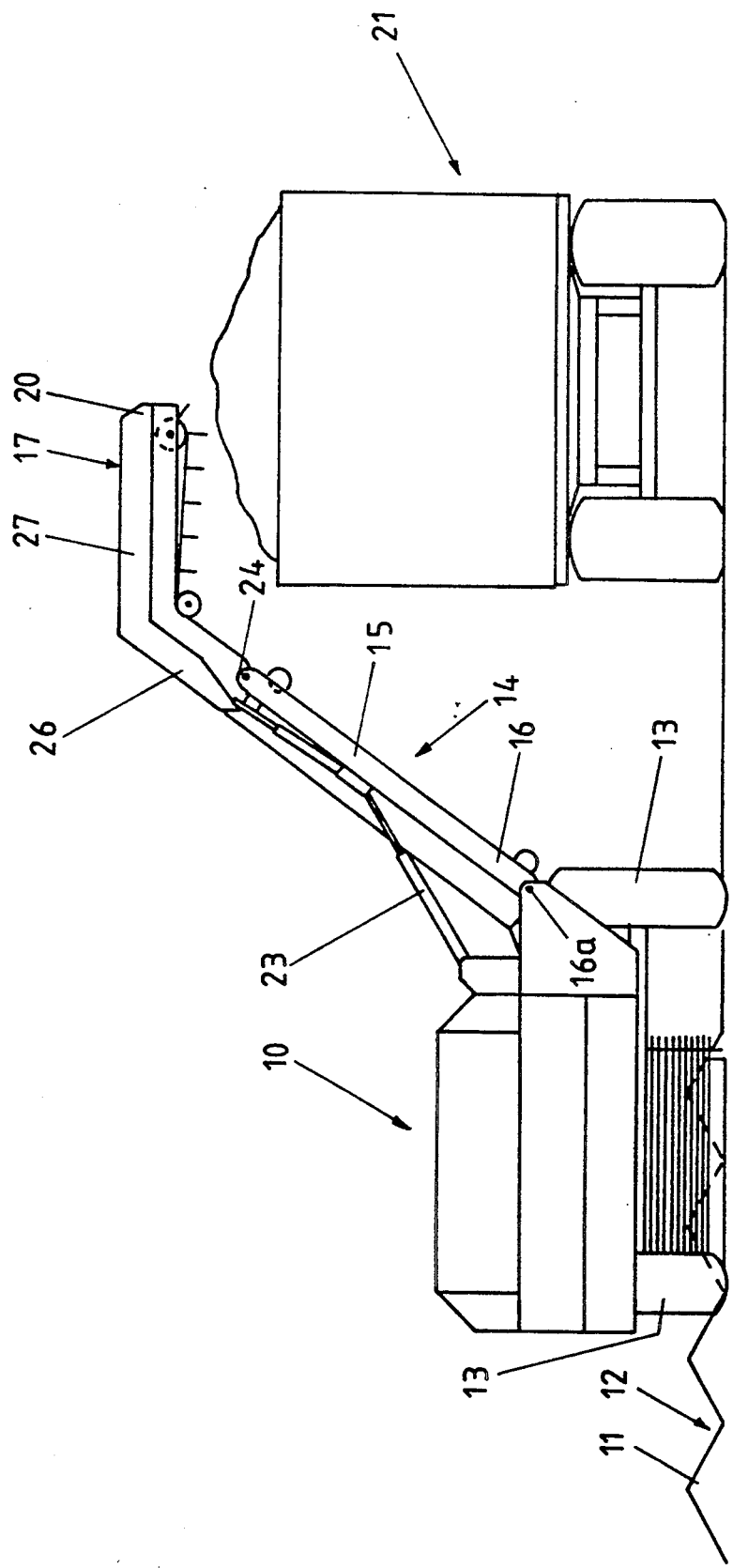
FIG. 2 is a view, similar to FIG. 1, showing the elevator adjusted to another discharge position in which the harvested crop can be elevated so as to fall under gravity into a collecting vehicle.
Figure 4:
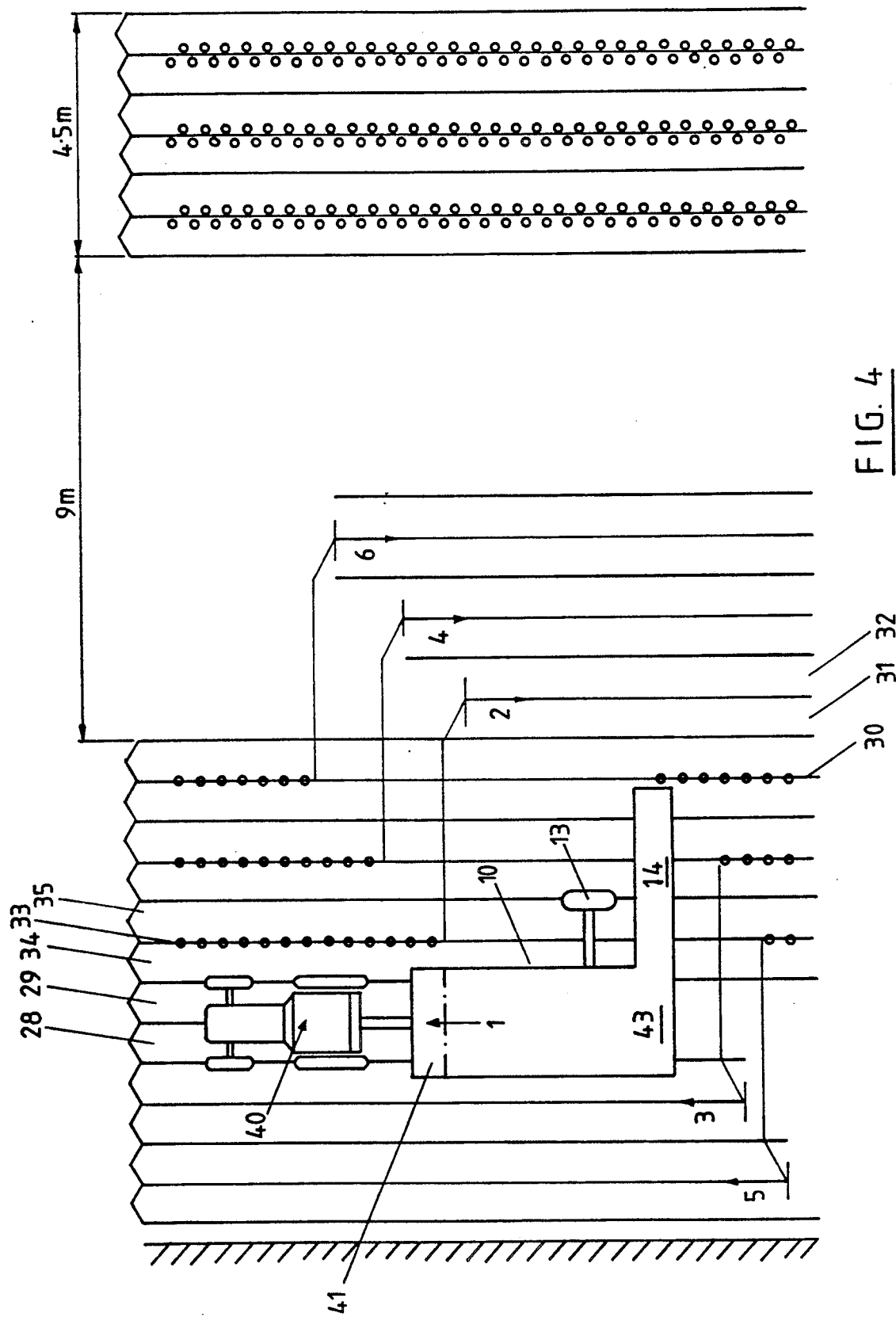
FIG. 4 is a schematic plan view illustrating one method in accordance with the invention for harvesting a root crop growing in parallel rows in a field.

Referring first to FIGS. 1 and 2 of the drawings, an agricultural harvesting machine according to the invention is designated generally by reference 10, and is intended to be towed behind a propelling vehicle 40 (see FIGS. 4 to 6) and to have its operating components driven via the power take-off shaft of the propelling vehicle in well known manner, and as shown schematically in FIGS. 4 to 6.

The machine 10 is intended to harvest root crops, and especially potatoes, growing in substantially parallel rows in the ground, with longitudinal spaces being defined between the adjacent rows over which can travel the wheels of the propelling vehicle and also those of the harvesting machine 10, without damaging the crop which is being harvested. In the case of potatoes, the crop grows in earthed-up rows 11, and the wheels then can run in the furrows 12 which are formed between each pair of adjacent rows of crop. Thus, as can be seen in FIG. 1, the wheels 13 of the machine 10 can each run in a respective furrow defined between adjacent pairs of rows of crops 11. The forward and rear wheels of the propelling vehicle 40 also can travel in these furrows, as can be seen in FIGS. 4 to 6.

The machine 10 therefore is provided with a wheel-supported frame which is movable over the ground in a direction parallel to the rows 11, and with the wheels running along the ground in the spaces defined between the rows. A digging mechanism 41 (shown schematically in FIG. 4) is provided at the forward end of the machine, and extends laterally by a sufficient extent to enable two adjacent rows of crop to be dug-up at the same time during each passage of the machine from one end of the field to the other. The digging mechanism may take the form of any suitable design of digging mechanism as used in potato harvesting machines.

The machine 10 will also be provided with suitable means (not shown) for separating the crop dug-up by mechanism 41 from any soil and small stones dug up at the same time, and means is also provided for directing the separated crop to a discharge station 43 (see FIG. 4) at the rear of the machine. This separating and directing means may take the form of any suitable design as used in potato harvesting machines, and part of this is shown in the rear elevation of FIG. 1 in the form of a conventional arrangement of endless travelling grid bars designated generally by reference 42.

Adjacent to the discharge station, a discharge elevator 14 is pivotally mounted on one side of the machine frame, and can occupy a number of different positions of adjustment relative to the machine, as will become apparent from the subsequent description with reference to the drawings.

The discharge elevator 14 comprises a main portion 15 which is pivotally mounted at one end 16 via a horizontal pivot 16a to the frame of the machine, and a tail portion 17 is pivotally connected to the main portion 15. The main portion 15 and the tail portion 17 are pivotally adjustable between a first mode of operation, as shown in FIG. 1, which is a lateral discharge position for depositing crop in a parallel row alongside the path of travel of the machine. As can be seen in FIG. 1, potatoes 18 are being deposited in a row 19 which extends parallel to the rows of growing potatoes 11, and depositing the potatoes 18 in this row enables them to be dried-up for any required length of time, prior to being subsequently lifted again during a further passage of the harvesting machine.

The elevator 14 can also be adjusted to a second mode of operation, as shown in FIG. 2, in which the crop can be elevated so as to be able to fall under gravity from the end 20 of the tail portion 17 and into a collecting vehicle 21 located alongside the machine 10.

The machine 10 therefore comprises a single piece of agricultural equipment which can operate in the manner of a conventional harvester in order to dig-up crop growing in rows 11 in the ground, or to raise crop previously deposited in rows 19, but which can be readily adjusted to operate in either one of the two required modes of operation, namely the lateral deposition mode shown in FIG. 1 when air drying of the crop in rows on the ground is required, and lateral elevation when the crop is required to be collected in the collecting vehicle.

In the first mode of operation, as shown in FIG. 1, the main portion 15 of the elevator is adjusted to a substantially horizontal position, or at a small upward inclination to the horizontal e.g. up to 30°, and the tail portion 17 is pivotally adjusted relative to the main portion 15 so that end 20 is located close to the ground surface, thereby to reduce the distance through which the potatoes fall onto the ground. The adjustment of the main portion 15 and tail portion 17 is also carried out in such a way that the potatoes can be deposited in one of the existing furrows (19) located adjacent to the machine. This existing furrow therefore holds the potatoes while they are being dried, and prior to a further passage of the machine along the furrow in order to pick-up the dried potato. Evidently, as can be seen from FIGS. 1 and 2, the machine 10 can pick-up two rows of a growing crop, but will deposit these two rows into a single drying row 19. However, as will be evident from the subsequent description with reference to FIGS. 4 to 6, the operator of the harvesting machine can follow any required predetermined patterns of movement backwards and forwards over the rows of crops, such that four rows of growing crop can be deposited into a single drying row. The subsequent harvesting of the dried rows of crop will then involve only one quarter of the number of paths of travel required for the initial digging-up of the crop. References 1, 2, 3, 4, 5, 6 used in FIGS. 4 and 5 denote alternative succesive paths of travel of a single (and repeatable) cycle of operation.

FIG. 1 shows in full lines the adjusted position of the tail portion 17, to enable the fullest lateral extent of transfer of crop from the machine, but if it is required to deposit the crop in furrows which are nearer to the machine, then the tail portion may be inwardly adjusted so that end 20 overlies any predetermined one of the inner furrows e.g. furrow 22 as shown in FIG. 1, with the tail portion 17 being shown in dashed outline. To enable the potatoes to be guided inwardly in this matter, the side 17a of the tail portion 17 may take the form of a piece of canvas, or a guide plate or chute, so that the potatoes can be discharged downwardly and inwardly in a direction towards the machine 10.

The main portion 15 of the elevator 14 can be pivoted about horizontal pivot axes at its lower end 16 by means of a ram 23, and tail portion 17 can be pivoted about a horizontal pivot axis 24 relative to the main portion 15 by means of a ram 25.

Figure 3:
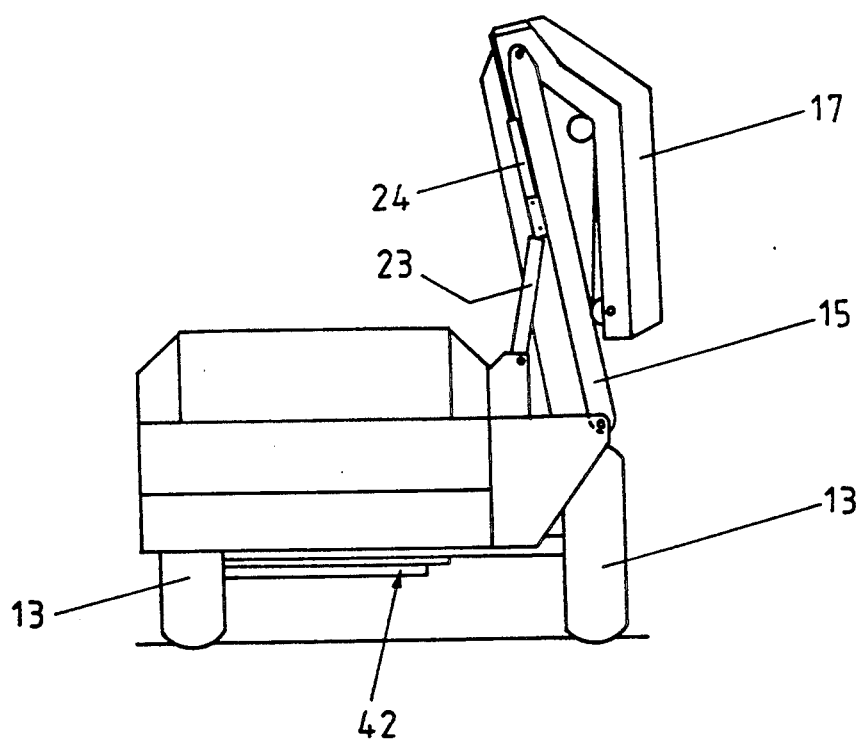
FIG. 3 is a rear view showing the elevator adjusted in an inward stowed or transport position.

FIG. 1 shows the lateral deposition position taken up by the main portion 15, and two alternative positions of the tail portion 17. FIG. 2 shows the elevational discharge position of the elevator 14, in which the main portion 15 is pivoted upwardly to an angle of about 60° to the horizontal, and the tail portion 17 is adjusted in such a way so that one part 26 forms a prolongation of the main portion 15, whereas a further part 27 extends substantially horizontally over the upper surface of the collecting vehicle 21 so that gravity discharge can take place. FIGS. 1 and 2 show three alternative positions of adjustment of the elevator 14, and FIG. 3 shows an upwardly and partly inwardly pivoted position of the elevator 14, suitable for transport of the machine.

The invention is also concerned with a method of harvesting root crops growing in substantially parallel rows in the ground, with longitudinal spaces defined between adjacent rows over which can travel the wheels of a propelling vehicle and a trailed harvesting machine coupled therewith, and examples of the method are disclosed in FIGS. 4 to 6.

FIG. 4 shows one example of a mode of digging-up two adjacent rows of crops at a time with the harvesting machine during each passage of the machine. The elevator 14 is pivoted to the fully extended lateral position, as shown in FIG. 1, and the first pass of the machine is shown by reference 1, and during this pass two rows of crops 28 and 29 can be dug-up, separated in the machine 10 from any soil and stones dug-up at the same time and then directed to a discharge station at the rear of the machine adjacent to the elevator 14. The crop obtained from the two rows 28 and 29 is then laterally discharged from the free end of the elevator 14 to fall under gravity into furrows 30. At the end of pass 1, the tractor and harvesting machine carry out a reverse pass in the direction of the arrow 2, which it will be noted is based six rows of crops away from the rows cleared during pass 1. During travel along the reverse pass 2, the two rows of crops 31 and 32 are laterally discharged to form a line of deposited crop 33 in a furrow defined between so far uncleared rows of crops 34 and 35.

At the end of pass 2, the harvesting machine 10 then follows a further pass in the direction of the arrow 3, with lateral discharge of the crops as shown by the arrow, and this continues through until a complete cycle up to pass 6 has been carried out. Evidently, as can be seen for furrow 3, this results in a double deposit derived from reverse pass 2 and forward pass 5, and therefore the six passes or lanes of travel 1 to 6 dig up 12 rows of growing crop, and deposit these 12 rows in only three furrows each bearing the product of four rows of growing crop.

The crops are then allowed to dry for any required length of time, and then the crop is picked-up by further passes of the harvesting machine, and then discharged, following adjustment of the elevator 15 to the position shown in FIG. 2, so that the dug-up and dried crop is collected in the collecting vehicle.

FIG. 5 shows an alternative type of pattern of an operating cycle of the machine, in such a way that only two rows of dug-up crops are deposited into each drying row or furrow.

FIG. 6 shows the manner by which the harvesting machine 10 can be used to pick-up the dried rows of crop, and then discharge the crop (with the elevator 14 raised to the position of the second mode of operation as shown in FIG. 2) into a trailer 44 towed behind a propelling vehicle 45.

I claim:

1. A harvesting machine for root crops growing in substantially parallel rows in the ground and which comprises:
    a wheel-supported frame which is movable over the ground in a direction parallel to said rows with the wheels running in spaces defined between the rows;
    a digging mechanism at the forward end of the machine and extending laterally by a sufficient extent to enable two adjacent rows of crop to be dug-up at the same time;
    means provided on the machine for separating the crop from any soil and small stones dug-up at the same time as the crop;
    means for directing the separated crop to a discharge station;
    a discharge elevator mounted on one side of the machine adjacent to the discharge station, said discharge elevator comprising a main portion mounted at one end on a pivotal mounting on the frame of the machine and a tail portion which is pivotally connected to the main portion;
    first drive means coupled with the main portion of the elevator and operative to pivot the main portion and the tail portion together about said pivotal mounting;
    second drive means coupled with the tail portion and operative independently of the first drive means in order to pivot the tail portion relative to the main portion; and
    in that the main portion and the tail portion can be adjusted between a first mode of operation in which the tail portion extends downwardly of the main portion so that a lower end of the tail portion is located close to the ground to discharge crop laterally of the machine and with the tail portion being adjustable by the second drive means in order to vary the lateral displacement of the lower end of the tail portion relative to the machine so as to deposit the crop in any required parallel row alongside the path of travel of the machine, and a second mode of operation in which the crop can be elevated so as to be able to fall under gravity into a collecting vehicle located alongside the machine.

2. A harvesting machine according to claim 1, in which the main portion of the elevator extends horizontally, or is slightly upwardly inclined to the horizontal when in the first mode of operation, and the tail portion is adjustable by the second drive means so that the lower end of the tail portion can be located inwardly toward the machine or outwardly of the connection of the tail portion to the main portion according to the required lateral distance of discharge of the crop from the machine.

3. A harvesting machine according to claim 1 in which the tail portion comprises a two part L-shape and is arranged such that, when in the second mode of operation, one part of the tail portion forms a prolongation of the main portion, and another part extends substantially horizontally.

4. A harvesting machine according to claim 1, in which the elevator is inwardly pivotable to an upright inoperative transport position under the action of the first drive means in which the main portion extends upwardly of its pivotal mounting on the machine frame, and the tail portion is adjusted by the second drive means to extend downwardly and substantially alongside the main portion.

5. A harvesting machine according to claim 2, in which the tail portion has a cover surface arranged to guide crop to be discharged inwardly.

6. A method of harvesting root crops growing in substantially parallel rows in the ground, with longitudinal spaces defined between adjacent rows over which can travel the wheels of a propelling vehicle and a trailed harvesting machine coupled therewith, the machine having an elevator mounted thereon for discharging the harvested crop, and the method being characterized by:
    digging-up two adjacent rows of crops at a time with the harvesting machine during each passage of the machine;
    separating-out the crop in the machine from any soil and stones dug-up with the crop, and directing the crop to a discharge station in the machine:
    laterally discharging the crop from the machine via the elevator, when the latter is adjusted to a lateral discharged mode, to deposit the crop in a row extending substantially parallel to the dug-up rows, and while the machine is digging-up the crop in said rows during each passage of the machine:
    allowing the crop deposited in the row to dry to any required extent;
    picking-up the deposited crop after required drying using the same harvesting machine; and,
    elevating the crop via the elevator when the latter is adjusted to an elevation mode, so that the crop can fall under gravity into a collecting vehicle located adjacent to the harvesting machine.

* * * * *